(12) United States Patent
Bedell et al.

(10) Patent No.: US 7,430,562 B1
(45) Date of Patent: Sep. 30, 2008

(54) SYSTEM AND METHOD FOR EFFICIENT DATE RETRIEVAL AND PROCESSING

(75) Inventors: Jeffrey A. Bedell, Arlington, VA (US); Michael Codini, Herndon, VA (US); William Hurwood, Washington, DC (US); Ashutosh K. Jhaveri, San Francisco, CA (US); Benjamin Z. Li, Great Falls, VA (US); Fabrice Martin, Washington, DC (US); Sadanand Sahasrabudhe, Great Falls, VA (US); Jun Yuan, Sterling, VA (US)

(73) Assignee: Microstrategy, Incorporated, McLean, VA (US)

( * ) Notice: Subject to any disclaimer, the term of this patent is extended or adjusted under 35 U.S.C. 154(b) by 0 days.

(21) Appl. No.: 09/883,499

(22) Filed: Jun. 19, 2001

(51) Int. Cl.
*G06F 17/00* (2006.01)

(52) U.S. Cl. .................. 707/102; 707/101; 707/10; 707/1; 707/2; 707/3

(58) Field of Classification Search .................. 707/2, 707/3, 4, 103 R, 101–102, 200, 10, 100
See application file for complete search history.

(56) References Cited

U.S. PATENT DOCUMENTS

| 4,506,326 A | 3/1985 | Shaw |
| 4,688,195 A | 8/1987 | Thompson |
| 4,829,423 A | 5/1989 | Tennant |
| 4,839,853 A | 6/1989 | Deerwester |
| 5,197,005 A | 3/1993 | Shwartz |
| 5,261,093 A | 11/1993 | Asmuth |
| 5,276,870 A | 1/1994 | Shan |
| 5,349,684 A | 9/1994 | Edem |
| 5,418,943 A | 5/1995 | Borgida |
| 5,421,008 A | 5/1995 | Banning |
| 5,555,403 A | 9/1996 | Cambot |
| 5,584,024 A * | 12/1996 | Shwartz .................. 707/4 |
| 5,664,182 A | 9/1997 | Nirenberg |
| 5,692,181 A | 11/1997 | Anand |
| 5,864,856 A | 1/1999 | Young |

(Continued)

OTHER PUBLICATIONS

Gupta, Himanshu et al., "Index Selection for OLAP," IEEE 1063-6382, pp. 208-219.

(Continued)

*Primary Examiner*—Sana Al-Hashemi
(74) *Attorney, Agent, or Firm*—Hunton & Williams, LLC

(57) ABSTRACT

A system and method for efficient data retrieval and processing in an online analytical processing system, a reporting system, a business intelligence system, or a data mining system. The system provides for retrieval and processing of a data result set from a plurality of data sources. The system includes a query structure assembly module, a syntax assembly module, and a process optimization module. The query structure assembly module defines a query structure based upon query assembly rules and a desired data set (such as the set of data for a particular OLAP report). The syntax assembly module defines one or more query language statements based upon the defined query structure. The process optimization module evaluates processing options based upon a database schema associated with the data sources. One or more query language statements may be assembled by the system and run against the data sources to return the desired data result set. A method and medium having processor readable code therein are also described.

23 Claims, 4 Drawing Sheets

U.S. PATENT DOCUMENTS

| | | | |
|---|---|---|---|
| 5,914,878 | A | 6/1999 | Yamamoto |
| 5,918,232 | A * | 6/1999 | Pouschine et al. ........ 707/103 R |
| 5,935,218 | A | 8/1999 | Beyda |
| 5,940,818 | A * | 8/1999 | Malloy et al. ................... 707/2 |
| 5,983,228 | A | 11/1999 | Kobayashi |
| 6,154,766 | A | 11/2000 | Yost |
| 6,247,008 | B1 | 6/2001 | Cambot |
| 6,275,818 | B1 * | 8/2001 | Subramanian et al. ......... 707/2 |
| 6,279,033 | B1 | 8/2001 | Selvarajan |
| 6,442,557 | B1 * | 8/2002 | Buteau et al. ................ 707/102 |
| 6,473,750 | B1 * | 10/2002 | Petculescu et al. .............. 707/3 |
| 6,546,381 | B1 * | 4/2003 | Subramanian et al. ......... 707/2 |
| 6,574,623 | B1 * | 6/2003 | Leung et al. .................... 707/5 |

OTHER PUBLICATIONS

Ho, Ching-Tien et al., "Partial-Sum Queries in OLAP Data Cubes Using Covering Codes," ACM 0-89791-910-6, pp. 228-237.

Robert C. Stern, Bruce M. Anderson and Craig W. Thompson, "A Menu-Based Natural Language Interface To A Large Database", Texas Instruments Incorporated, P. O. Box 660246, MS 238, Dallas, Texas 75266, NAECON: National Aerospace & Electronics Conference, Dayton, Ohio, May 20-24, 1985.

Harry R. Tennant, Kenneth M. Ross, Richard M. Saenz, Craig W. Thompson, and James R. Miller, "Computer Science Laboratory," Central Research Laboratories,. Texas Instruments Incorporated, Dallas, Texas, 21st Annual Meeting of the Association for Computational Linguistics, MIT, Jun. 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Languages Interfaces To Databases, Proceedings of the Ninth International Conference on Very Large Data Bases, Florence, Italy, Oct. 31-Nov. 2, 1983, pp. 43-55.

Craig W. Thompson, John Kolts, and Kenneth W. Ross, "A Toolkit for Building Menu-Based Natural Language" Interfaces, Texas Instruments Incorporated, P. O. Box 226015, MS 238, Dallas, Texas 75265, 1985.

Craig Warren Thompson, M.A., B.A., Using Menu-Based Natural Language Understanding to Avoid Problems Associated with Traditional Natural Language Interfaces to Databases, Dissertation Presented to the Faculty of the Graduate School of The University of Texas at Austin, May 1984.

Business Objects User's Guide Version 5.1.
Getting Started with Business Objects Version 5.1.
Business Objects Deployment Guide.
Broadcast Agent 5.1.
Business Objects 5.1.
Web Intelligence 2.6.
Business Objects Designer's Guide Version 5.1.
Business Objects Error Message Guide Version 5.1.
Business Objects Generic ODBC Access Guide Version 5.1.
Business Objects Info View User's Guide.
Business Objects Installation and Upgrade Guide.
Business Objects MS Access Database Guide Version 5.1.
Business Objects MS SQL Server Database Guide Version 5.1.
Business Objections Supervisor's Guide Version 5.1.
GIS/LIS'88 Proceedings accessing the world, vol. 2 pp. 741-750.
Quick Start MicroStrategy Agent Version 6.0.
User Guide MicroStrategy Agent Version 6.0.
User Guide MicroStrategy Architect Version 6.0.
User Guide MicroStrategy Objects Version 6.0.
Excel Add-In MicroStrategy Objects Version 6.0.
User Guide MicroStrategy Intelligence Server Version 6.0.
User Guide MicroStrategy Administrator Version 6.0.
Administrator Guide MicroStrategy Administrator Version 6.5.

* cited by examiner

SYSTEM AND METHOD FOR EFFICIENT DATE RETRIEVAL AND PROCESSING

FIELD OF THE INVENTION

The invention relates to the field of query execution optimization in the generation query language statements for data retrieval and processing in a business intelligence, on-line analytical processing, reporting, or data mining system.

BACKGROUND OF THE INVENTION

The ability to act quickly and decisively in today's increasingly competitive marketplace is critical to the success of any organization. The volume of data that is available to organizations is rapidly increasing and frequently overwhelming. The availability of large volumes of data presents various challenges. One challenge is to avoid inundating an individual with unnecessary information. Another challenge is to ensure all relevant information is available in a timely manner.

One known approach to addressing these and other challenges is known as data warehousing. Data warehouses, relational databases, and data marts are becoming important elements of many information delivery systems because they provide a central location where a reconciled version of data extracted from a wide variety of operational systems may be stored. As used herein, a data warehouse should be understood to be an informational database that stores shareable data from one or more operational databases of records, such as one or more transaction-based database systems. A data warehouse typically allows users to tap into a business's vast store of operational data to track and respond to business trends that facilitate forecasting and planning efforts. A data mart may be considered to be a type of data warehouse that focuses on a particular business segment.

Decision support systems have been developed to efficiently retrieve selected information from data warehouses. One type of decision support system is known as an on-line analytical processing system ("OLAP"). In general, OLAP systems analyze the data from a number of different perspectives and support complex analyses against large input data sets.

OLAP systems may retrieve and process data from one or more data warehouses or data marts. The data warehouses or data marts may include one or more relational databases. A relational database may include one or more data sources arranged in tables. The tables may be interrelated based upon keys, such as primary keys and foreign keys. Generally, a key is one or more columns in a table that may be used to designate, locate, and retrieve data related to a unique entity. The columns, data types, arrangement of tables, and relationships among tables may be referred to as a database schema.

The databases within the data warehouses or data marts may include a database management system (DBMS) for governing manipulation of data within the databases. Some example DBMS products include Oracle™, Informix™, DB2 (Database 2), Sybase™, Microsoft SQL Server™, Microsoft Access™, and others. Each DBMS may include different methods for accessing and manipulating the data within the databases. Each DBMS may define a query language for accessing and manipulating data within the databases associated with that DBMS. For example, many commercially available DBMS utilize Structured Query Language (SQL). While SQL provides a common ground among many DBMS, implementation of SQL is by no means standard. Each DBMS includes variations in SQL query syntax, such as variable type definitions, naming restrictions, enhanced functions and calculations, shortcuts, defaults, and other features. Additionally, each DBMS may support different syntax for navigating the access and security features associated with the associated databases. A given OLAP system may handle interactions with a variety of DBMS simultaneously (such as when a single data warehouse includes multiple databases and DBMS from multiple vendors) or as a matter of compatibility with multiple competing DBMS.

OLAP systems may be used to retrieve and process data from large data sets, such as Very Large Databases (VLDBs). Efficient use of memory, processing, and communication resources may be desirable when dealing with large data sets and/or limited memory, processing, and communication resources. Each DBMS may include its own memory, processing, and communication resources. Additionally, each DBMS may include a specific set of data processing tools and associated query syntax. An OLAP system may include additional memory, processing, and communication resources. An OLAP system may include additional data processing tools, as well as tools and logic for analyzing, filtering, and interfacing with the data warehouses or data marts. Interaction between an OLAP system and one or more DBMS may include communicating queries to the DBMS and returning data sets to the OLAP system. Division of processing tasks and the amount of data transferred between the DBMS and OLAP system may impact overall query processing efficiency.

Very large data sets may contain a considerable amount of redundant data. In some cases, the redundant data may exist in varying levels of detail, aggregation, abstraction, or transformation (e.g., through formula or other calculation). As a result, there are frequently multiple ways to retrieve the same data set from a given data source. Additionally, many query languages contain a number of functions, shortcuts, and processing structures that may provide redundant methods of retrieving a given data set from the same set of tables. Each DBMS may carry out similar functions with varying levels of efficiency.

Prior OLAP systems do not make efficient use of OLAP system and DBMS resources and capabilities. Prior OLAP systems do not utilize knowledge of database schema, DBMS resources and capabilities, intermediate data sets, and/or other properties of OLAP systems and VLDBs to efficiently retrieve and process data.

These and other drawback exist with regard to prior OLAP systems.

BRIEF SUMMARY OF THE INVENTION

The embodiments of the invention may overcome these and other drawbacks of prior OLAP systems. Specifically, the embodiments of the invention promote optimization of query language statements to be run against a data source. Even minor improvements in the selection of base tables, intermediate data handling, function and calculation selection, and the use of DBMS specific syntax, shortcuts, and enhancements may dramatically improve the speed and processing efficiency of complex queries against large data sources. Improved efficiency may be important when handling a large number of simultaneous queries, such as in a decision support system for a large sales force, financial institution, or other knowledge driven enterprise.

One aspect of the embodiments of the invention is a system for retrieval and processing of a data set from a data source. The system includes a query structure assembly module, a syntax assembly module, and a process optimization module.

The query structure assembly module defines a query structure based upon query assembly rules and a desired data set (such as the set of data for a particular OLAP report). The syntax assembly module defines one or more query language statements based upon the defined query structure. The process optimization module evaluates processing options based upon a database schema associated with the data source. One or more query language statements may be assembled by the system and run against the data source to return the desired data set.

Another aspect of the embodiments of the invention is a method of generating a query language statement to be run against a data source. The method may include the steps of generating a query structure, generating query language syntax, and evaluating the structure and syntax for process optimization. The query structure may be based upon a desired data set and a database schema associated with the data source. The query language syntax may be based upon the query structure and calculated to return the desired data set from the data source. Process optimization may be based upon evaluating query assembly rules, syntax descriptions, or syntax patterns associated with process optimization.

Still another aspect of the embodiments of the invention is a medium having a processor readable program code embodied therein for retrieving and processing data from a data source. The medium may include code for causing the processor to evaluate multiple sets of base tables within the data source for generating a desired data set. The medium may also include code for causing the processor to evaluate one or more intermediate tables for reusability in generating the desired data set. The medium may also include code for causing the processor to evaluate multiple methods for generating intermediate data for use in generating the desired data set. The medium may include code for causing the processor to evaluate multiple join paths used for joining tables to return the desired data set. Finally, the medium may include code for causing the processor to assemble at least one query language statement based upon evaluation of the sets of base tables, the intermediate data tables, the methods for generating temporary tables, and the join paths.

Other objects and advantages of the present invention will be apparent to one of ordinary skill in the art upon reviewing the detailed description of the present invention.

DETAILED DESCRIPTION OF THE INVENTION

Figure 1:
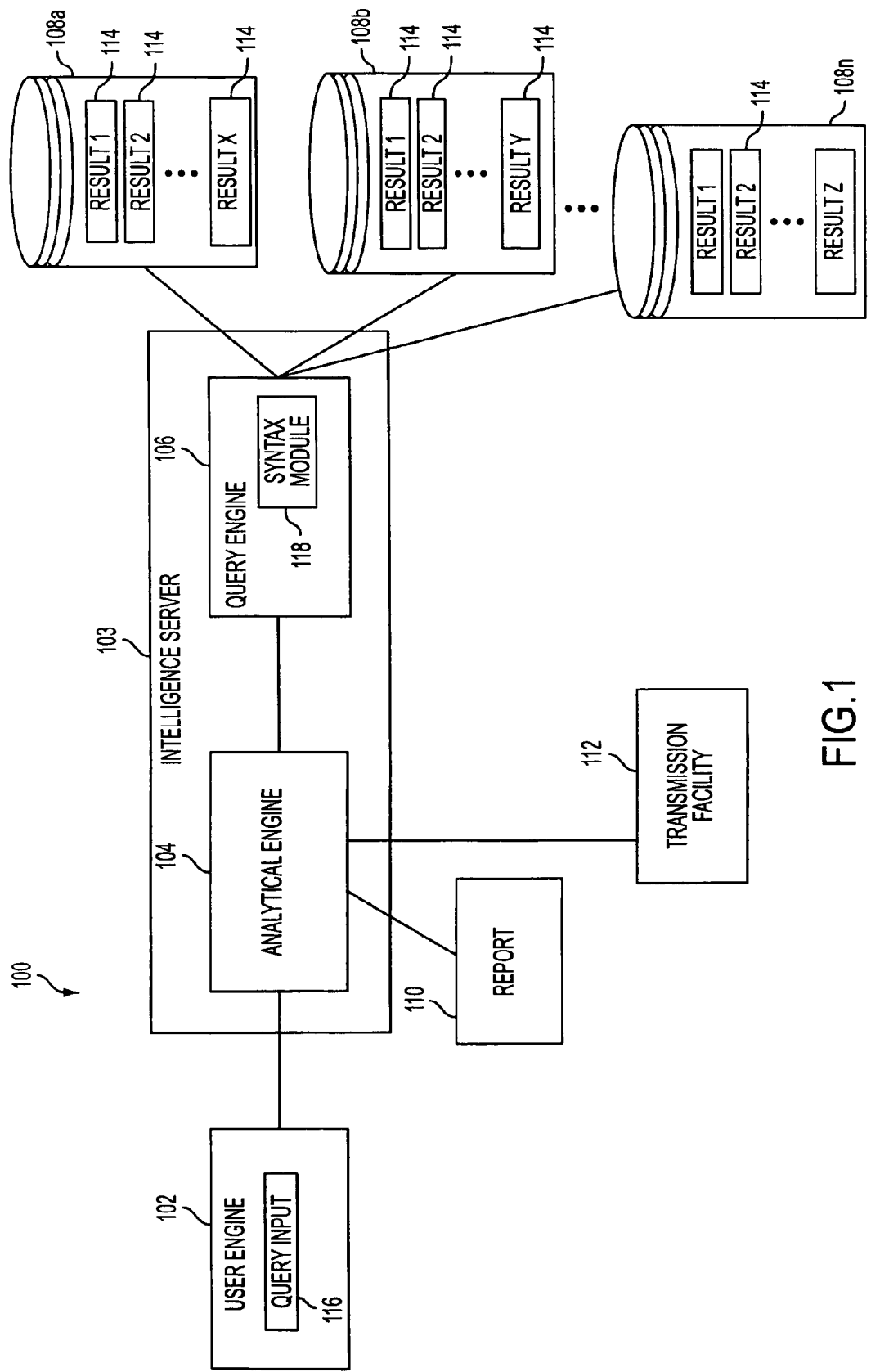
FIG. 1 is a block diagram illustrating an architecture for a system according to an embodiment of the invention.
Figure 2:
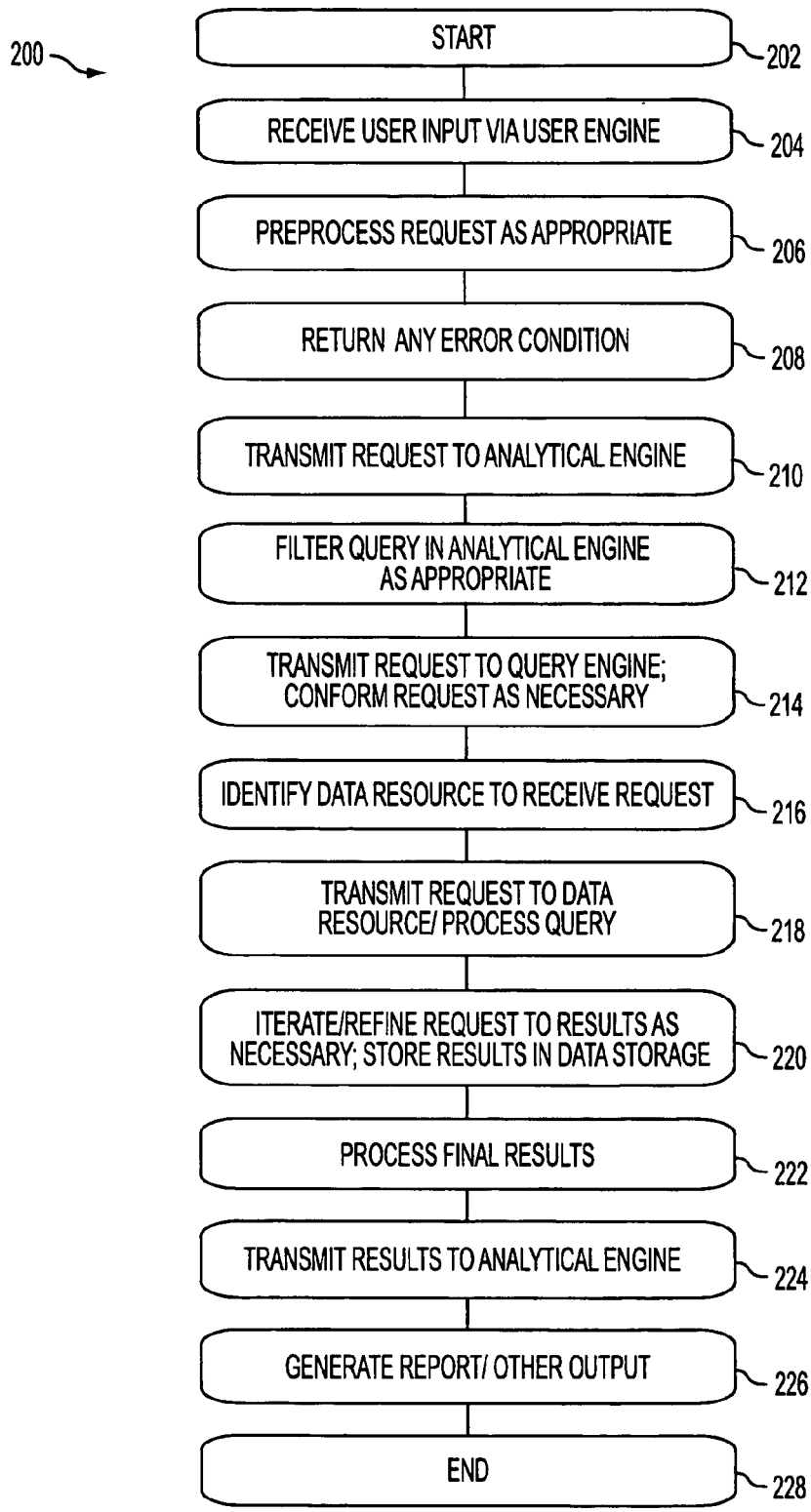
FIG. 2 is a flowchart illustrating steps performed by a process utilizing a query engine according to an embodiment of the invention.

While the present invention relates to data retrieval and processing optimization in an OLAP system, a brief discussion of one embodiment of an OLAP system in which the present invention may be used is shown in FIGS. 1 and 2.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a WindowS™ 2000 operating system, a Unix operating system, a Linux operating system, a Xenix operating system, an IBM AIX™ operating system, a Hewlett-Packard UXT operating system, a Novell Netware™ operating system, a Sun Microsystems Solaris™ operating system, an OS/2 operating system, a BeOS™ operating system, a MacIntosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the NarrowcasterT platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users may then receive access to reports through various types of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 patent. The platform of FIG. 1 may have many other uses, as described in detail with respect to the MicroStrategy 7 and 7.1 platform, the details of which will be appreciated by one of ordinary skill in the reporting and decision support system art.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b . . . 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Figure 3:
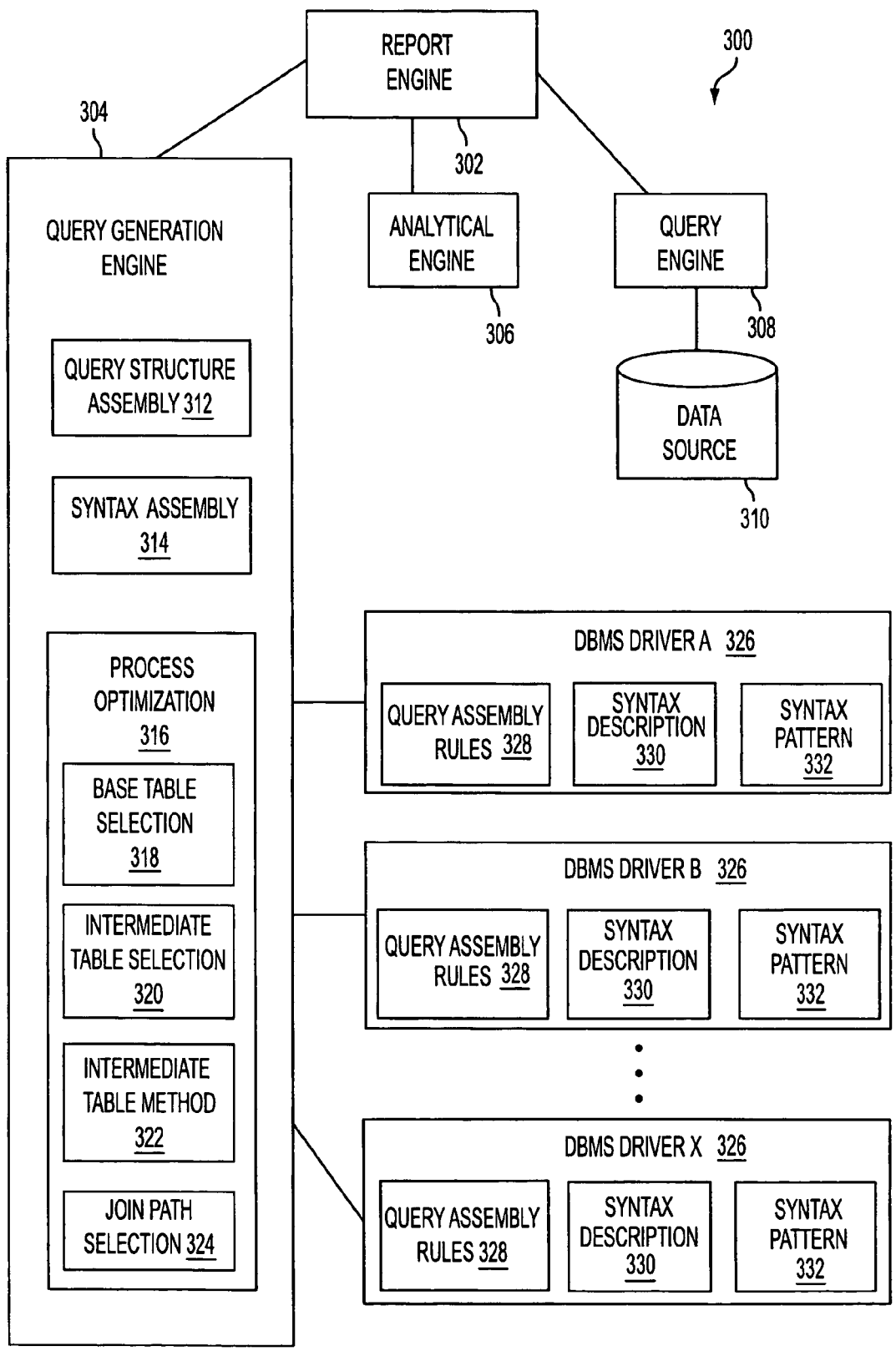
FIG. 3 is a block diagram illustrating an architecture for a system according to an embodiment of the invention.

In an embodiment of the invention illustrated in FIG. 3, a system 300 for data retrieval and processing is shown. The system 300 may be a portion of an OLAP system, such as an OLAP embodiment of the system 100 from FIG. 1, above. The system 300 includes a report engine 302, a query generation engine 304, an analytical engine 306, and a query engine 308 for retrieving data from a data source 310. In the embodiment shown, the report engine 302 may control the collaborative workflow among query language engine 304, analytical engine 306, and query engine 308. The report engine 302 identifies a data set desired for a particular report or set of reports and communicates the parameters of the data set to the query generation engine 304. The query generation engine 304 is responsible for generating a query structure and query language statements capable of retrieving and processing the desired data set. The analytical engine 306 provides processing, such as calculations and transformations (e.g., analytical calculations, subtotal calculations, pivoting, etc.), which is not performed at the database level. The query engine 308 sends one or more query language statements to the data source 310 for processing, generally via a DBMS. The query engine 308 also receives the result set from the data source 310. In one embodiment, the report engine 302 may coordinate multiple passes and data exchanges among the query generation engine 304, the analytical engine 306, and the query engine 308 in order to efficiently utilize the processing resources of the OLAP system and the DBMS for a complex data set.

The query generation engine 304 may include a number of modules for generating a query execution plan and related query structure and query language statements. In the embodiment shown, the query generation engine 304 includes a query structure assembly module 312, a syntax assembly module 314, and a process optimization module 316. The query structure assembly module 312 generates a query structure (e.g., a logic tree) identifying data retrieval and processing to be done against the data source 310 and processing to be done by the analytical engine 306. The syntax assembly module 314 generates query language statements for retrieving data, with or without data source processing, from the data source 310. The syntax assembly module 314 may also generate query language statements for processing to be done by the analytical engine 306. The process optimization module 316 evaluates one or more features of the query structure and query language statements for optimization of processing. The process optimization module 316 may be incorporated into the logic applied by the query structure assembly module and the syntax assembly module.

In one embodiment, the query structure assembly module 312, the syntax assembly module 314, and the process optimization module 316 may utilize a set of query assembly rules, syntax descriptions, and syntax patterns to evaluate the desired data set and generate the query execution plan. The query assembly rules, syntax descriptions, and syntax patterns may incorporate basic logic, such as lookup tables, dependencies, and conditions, for parsing the parameters of the desired data set to generate the query structure and query language statements. The query assembly rules, syntax descriptions, and syntax patterns may be based upon identification of the data set parameters and a database schema associated with the data source 310. The query assembly rules, syntax descriptions, and syntax patterns may also incorporate information about the data source (e.g., table sizes, relationships among aggregate/abstracted/transformed data, data gaps, etc.), information about a report or set of reports (e.g., repeated calculations, metrics, drilling patterns, pivots, etc.), information regarding VLDBs, and other information. The query assembly rules, syntax descriptions, and syntax patterns may incorporate logic and syntax based upon the query language, enhanced functions, definitions, limitations, shortcuts, and optimizations present in various DBMS. In the embodiment shown, DBMS drivers are used for providing DBMS specific query assembly rules, syntax descriptions, and syntax patterns.

Process optimization module 316 may include any number of optimization features for generating the query execution plan. It should be understood that optimization may include any change improving the efficient use of system resources. Optimizations may be slight incremental improvements in processing efficiency and resource use. Optimization should not be limited to maximizing the efficiency of the system, but includes all manner of improvements, even if they are short of optimal. In the embodiment shown, there are four example optimization features. The example optimization features include a base table selection module 318, an intermediate table selection module 320, an intermediate table method module 322, and a join path selection module 324. The base table selection module 318 evaluates redundant combinations of base tables that may be used to return the desired data set. In one embodiment, the base tables selection module 318 evaluates the size of each possible combination of base tables in order to minimize excess data handling. The intermediate table selection module 320 evaluates intermediate tables, such as temporary tables used in calculating the desired data set. In one embodiment, intermediate table selection module 320 identifies intermediate tables that may be used repeatedly in multiple calculations for the desired data set in order to ensure that such temporary tables are created only once and maintained for repeated use. The intermediate table method module 322 evaluates the method used to handle any intermediate tables for use in calculating the desired data set. In one embodiment, the intermediate table method module 322 determines whether creation of a permanent table, temporary table, view, derived table, or sub-query is the most efficient method for handling intermediate data calculations. The join path selection module 324 evaluates the possible join paths that may be used to return the desired result set. In one embodiment, multiple redundant joins that could be used to generate the desired data set are evaluated to determine which combination of joins is optimal. In one embodiment, the process optimization module 316 may include a variety of additional miscellaneous optimization features (e.g., the avoidance of "SELECT DISTINCT" syntax where other syntax patterns yield the same results, etc.). Additional optimization features are possible in the process optimization module 316. In one embodiment, the base table selection module 318, the intermediate table selection module 320, the intermediate table method module 322, and the join path selection module 324 may operate simultaneously, iteratively, and/or in concert to balance the interrelations between the base tables, intermediate data, and join paths.

The base table selection module 318 may include a number of logical rules, dependencies, and conditions for selecting a set of base tables to use for the query to the data source 310 and any calculations through the DBMS or the analytical engine 306. In one embodiment, the base selection module 318 is embodied in one or more query assembly rules. The query assembly rules may be evaluated by the query structure assembly module 312 during initial parsing of the desired data set parameters and assembly of the query structure. The base table selection module 318 may evaluate the database schema associated with the data source 310 to determine one or more distinct sets of tables that may be used to generate the data in the desired data set. If multiple distinct sets of tables are identified, the base table selection module 318 may identify one or more metrics associated with the identified sets of tables. The base table selection module 318 may then select the table or set of tables that satisfies the most metrics in the fewest number of passes. Similarly, the identified sets of tables may be evaluated to minimize handling of superfluous data by choosing smaller tables where possible. In some instances, evaluation of base tables may recommend execution of a base table join to reduce the number of passes required to return the desired data set. Selection of a set of base tables may be informed by DBMS support for and handling of full outer joins, partitions, and other data source features.

The intermediate table selection module 320 may include a number of logical rules, dependencies, and conditions for identifying the intermediate data tables that may be used to calculate the desired result set. For example, when calculating a filtered total for the desired result set, the filtering totals may be generated in a single intermediate table and applied to filtering multiple data sets without being recalculated each time. In one embodiment, the intermediate table selection module 320 is embodied in one or more query assembly rules. The query assembly rules may be evaluated by the query structure assembly module 312 during initial parsing of the desired data set parameters and assembly of the query structure. The identified intermediate data tables may be evaluated for common features to define intermediate data tables that may be reused in multiple calculations. The intermediate data tables to be evaluated may be suggested by selection of a set of base tables by the base table selection module 318. Some example instances when reuse of an intermediate table may be appropriate are: (1) when a filter is equal or higher than a parent table, an intermediate table may be obtained for a child table; (2) when multiple selections are going to be made off of a calculated metric (e.g., top 10, bottom 15%, >1 million, etc.), the calculated metric may be stored in an intermediate table; or, (3) for contribution reports, selections from a parent table may be obtained from an intermediate table based on the child table. Additional instances of intermediate table reusability are also possible.

The intermediate table method module 322 may include a number of logical rules, dependencies, and conditions for selecting an preferred method of generating intermediate data. The intermediate table method module may be informed by the syntax descriptions for a particular DBMS that may define the options support for generating intermediate data. In one embodiment, the intermediate table method module 322 is embodied in one or more query assembly rules. The query assembly rules may be evaluated by the query structure assembly module 312 during initial parsing of the desired data set parameters and assembly of the query structure. There are a number of constructs that may be used for generating intermediate data. Some example constructs are: permanent tables, temporary tables, permanent views, derived tables, and common table expressions. The choice of permanent or temporary tables may depend on the catalogue contention encountered when creating several real tables concurrently. Permanent views place less overhead on the system, but place more strain on a database optimizer associated with database maintenance. Derived tables and common table expressions are typically resolved as views but do not have the same requirements. When creating permanent or temporary tables, the DBMS may need to support the ability to locate, index, and collect statistics on the newly generated table. This ability may vary greatly among DBMS and even release versions of the same DBMS. The location of the newly generated tables may also be a consideration. Derived tables avoid many of the considerations for temporary and permanent intermediate tables. However, some DBMS do not support derived tables at all. Additionally, DBMS that support derived tables have different levels of optimization and limits on derived table use. Derived tables are not reusable, lack an index, and can cause very large query language statements. In one embodiment, derived tables may be used (where supported) for multipass intermediate results and temporary tables may be used for compiled filters and metric qualification. Some DBMS support sub-queries embedded in select statements. In one embodiment, embedded sub-queries may be used (where supported) for transformative analysis and split metric calculation. The intermediate table method module 322 may evaluate the advantages and disadvantages of each supported method in order to select the optimal intermediate data method.

The join path selection module 324 may include a number of logical rules, dependencies, and conditions for identifying and evaluating join paths for the query to the data source 310. In one embodiment, the join path selection module 324 is embodied in one or more query assembly rules. The query assembly rules may be evaluated by the query structure assembly module 312 during initial parsing of the desired data set parameters and assembly of the query structure. The join path selection module 324 may be informed by the syntax descriptions for a particular DBMS that may define the options supported for generating join paths. The length and complexity of join paths may be burdensome to the processing resources of the data source. The join path selection module 324 may identify redundant join paths based upon the set of base tables identified by base table selection module 318. Different DBMS may support a variety of join mechanisms and syntaxes that may provide additional redundant join paths to be evaluated. Additionally, different DBMS may process certain types of joins differently and with varying efficiency. The join path selection module 324 may evaluate the syntax descriptions for the relevant DBMS in identifying and evaluating join paths.

The query generation engine 304 and its various modules, the query structure assembly module 312, the syntax assembly module 314, and the process optimization module 316, may utilize one or more drivers for generating the query execution plan. The drivers may supplement query assembly rules, syntax descriptions, and syntax patterns in the query generation engine. In one embodiment, the drivers are separable components from the query generation engine (e.g., a separate file or code object), such that they may be interchanged or modified without altering or causing recompilation of the query generation engine 304. The drivers may include both a compiled code object and one or more external data files to facilitate modification of the drivers without the need to recompile the code object. In the embodiment shown, a number of external drivers 326 (DBMS driver A, DBMS driver B . . . DBMS driver x) corresponding to specific DBMS (or versions of DBMS) are available to the query generation engine 304. For example, DBMS driver A may correspond to Oracle™ query syntax and optimization and DBMS driver B may correspond to Sybase™ query syntax and optimization. The number of external drivers 326 may include correct syntax for the supported DBMS and optimal query language and structure for the supported DBMS. The optimizations may include decisions made during the parsing of the data set and during the generation of the query language statements. In one embodiment, all parsing and query language statement generation that is not generally applicable across all supported DBMS may be handled by the number of external drivers 326. In the embodiment shown, the number of external drivers 326 include query assembly rules 328, syntax description 330, and syntax pattern 332.

Figure 4:
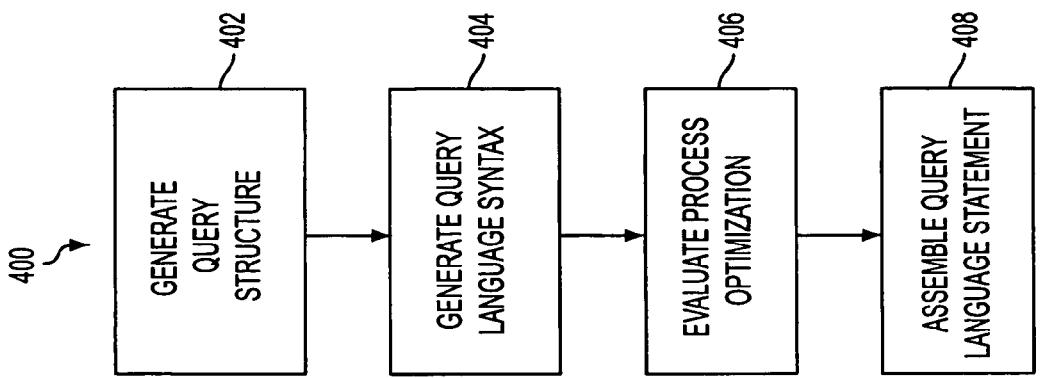
FIG. 4 is a flowchart illustrating a method of generating a query language statement according to an embodiment of the invention.

In an embodiment of the invention illustrated in FIG. 4, a method 400 for generating query language statement is shown. The method 400 may be used to generate a plurality of query language statements corresponding to portions of a query structure for implementing a query execution plan. In one embodiment, the method 400 may be implemented by an embodiment of the system 300 shown in FIG. 3. In step 402, a query structure is generated. In step 404, query language syntax is generated. In step 406, one or more aspects of the query structure and query language syntax are evaluated for process optimization. In step 408, one or more query language statements for executing the query structure using the query language syntax are assembled. The query language statements may be executed against a data source to return a desired data set.

Figure 5:
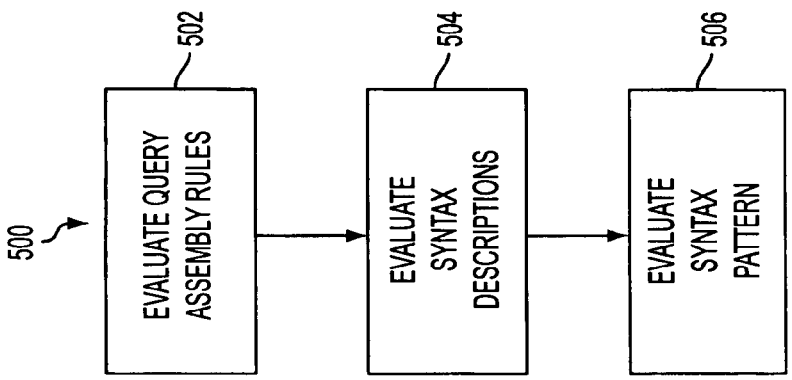
FIG. 5 is a flowchart further illustrating the method of generating a query language statement of FIG. 4.

The method 400 of FIG. 4 is further illustrated with regard to a method 500 in FIG. 5. The method 500 or any portion thereof may be used for one or more of steps 402, 404, 406, and 408 in the method 400. In step 502, query assembly rules are evaluated to determine the abstract selections, joins, functions, and calculations that may be combined to achieve the desired data set. In step 504, syntax descriptions are evaluated to determine the query language options available for fulfilling the abstract structure of the query. In step 506, syntax patterns are evaluated to generate correct query language syntax using the actual references (e.g, tables, columns, keys, etc.) for the data source.

Figure 6:
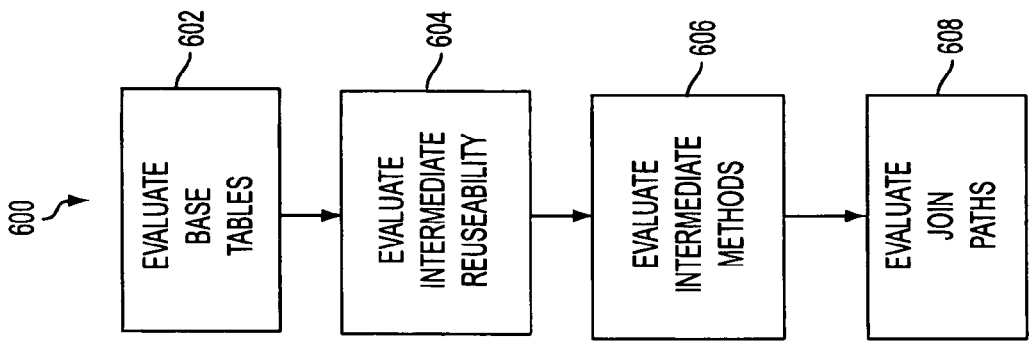
FIG. 6 is a flowchart illustrating a method of evaluating process optimization according to an embodiment of the invention.

In an embodiment of the invention illustrated in FIG. 6, a method 600 for evaluating process optimization is shown. The method 600 may be an optimization routine used in generating one or more query language statements for returning a desired data set from a data source. In one embodiment, the method 600 is an example of step 406 of method 400 shown in FIG. 4. In one embodiment, the method 600 is executed as specific query assembly rules and syntax descriptions in method 500 shown in FIG. 5. In step 602, a number of redundant sets of base tables are evaluated to minimize excess data. In step 604, an intermediate table is evaluated to determine its reusability in multiple selections or calculations. In step 606, a number of intermediate methods are evaluated to determine the most efficient method of generating intermediate data. In step 608, a number of redundant join paths are evaluated to identify the most efficient use of joins.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A computer-implemented system for retrieval and processing of a data set from one or more data sources comprising:
   a query structure assembly module for defining a query structure based upon a plurality of query assembly rules and a desired data set, wherein the plurality of query assembly rules are being used by the query structure assembly module to evaluate the desired data set;
   a syntax assembly module for defining at least one query language statement based upon the defined query structure;
   a process optimization module for evaluating processing options based upon a database schema associated with the data source, the process optimization module including an intermediate data processing method module for evaluating a plurality of methods for generating intermediate data sets within the data source(s) to determine a method for generating intermediate data sets within the data source(s) for calculating the desired data result set; and
   whereby at least one query language statement is assembled and run against the data source(s) to return the desired data result set.

2. The system of claim 1, wherein the process optimization module includes a table selection module for evaluating the size of a selected set of tables from the database schema.

3. The system of claim 1, wherein the process optimization module includes an intermediate data processing selection module for evaluating the reusability of an intermediate data set in returning the desired data result set.

4. The system of claim 1, wherein the process optimization module includes a join path selection module for evaluating the length of at least one join path used in returning the desired data result set.

5. The system of claim 1, wherein the query structure assembly module accesses a query assembly rule associated with a selected database management system.

6. The system of claim 1, wherein the syntax assembly module accesses a syntax description associated with a selected database management system.

7. The system of claim 1, wherein the process optimization module accesses a query assembly rule, a syntax description, or a syntax pattern associated with a selected database management system.

8. The system of claim 1, wherein the system is a component in an online analytical processing systems, a reporting system, a business intelligence system, or a data mining system.

9. A computer-implemented method of generating a query language statement to be run against one or more data sources, comprising the steps of:
   generating a query structure based upon a database schema associated with the data source, query assembly rules, and a desired data result set, the query assembly rules being used to evaluate the desired data set;
   generating query language syntax based upon the query structure for returning the desired data result set from the data source(s);
   evaluating a plurality of query assembly rules, syntax descriptions, or syntax patterns for process optimization;
   evaluating a plurality of methods for generating intermediate data sets; and
   returning a method for generating intermediate data sets.

10. The method of claim 9, wherein the step of evaluating the plurality of query assembly rules, syntax descriptions, or syntax patterns for process optimization includes evaluating the size of a plurality of sets of identified tables for returning the desired data result set.

11. The method of claim 9, wherein the step of evaluating the plurality of query assembly rules, syntax descriptions, or syntax patterns for process optimization includes evaluating the reusability of intermediate data sets.

12. The method of claim 9, wherein the step of evaluating a plurality of query assembly rules, syntax descriptions, or syntax patterns for process optimization includes evaluating a plurality of join paths used in returning the desired data result set.

13. The method of claim 9, wherein the step of evaluating a plurality of query assembly rules, syntax descriptions, or syntax patterns for process optimization includes evaluating at least one query assembly rule, syntax description, or syntax pattern associated with a selected database management system.

14. The method of claim 9, wherein the step of generating a query structure includes evaluating at least one query assembly rule associated with a selected database management system.

15. The method of claim 9, wherein the step of generating query language syntax includes evaluating at least one syntax description or syntax pattern associated with a selected database management system.

16. The method of claim 9, wherein the method is implemented in an online analytical processing systems, a reporting system, a business intelligence system, or a data mining system.

17. A medium having a processor readable program code embodied therein for retrieving and processing data from one or more data sources comprising:
   code for causing the processor to evaluate a plurality of sets of tables within the data source(s) for generating a desired data result set;
   code for causing the processor to evaluate at least one intermediate data set for reusability in generating the desired data result set;
   code for causing the processor to evaluate a plurality of methods for generating intermediate data sets for use in generating the desired data result set;
   code for causing the processor to evaluate a plurality of join paths used for joining tables to return the desired data result set; and
   code for causing the processor to assemble at least one query language statement based upon the query structure and the evaluations of the plurality of sets of tables, the at least one intermediate data set, the plurality of methods for generating intermediate data sets, and the plurality of join paths.

18. The medium of claim 17, further comprising code for causing the processor to evaluate at least one query assembly rule associated with a selected database management system.

19. A computer-implemented system for constructing a structured query language statement to be run against at least one database, comprising:
   a query structure assembly module for constructing a query structure based upon an evaluation of a desired data set by at least one query assembly rule;
   a syntax assembly module for defining at least one query language statement based upon the constructed query structure; and
   a process optimization module for evaluating the construction of the query structure and the defining of the at least one query language statement, the evaluation occurring during the construction of the query structure and/or during the defining of the at least one query statement, the process optimization module serving to evaluate a plurality of methods for generating intermediate data sets, and returning a method for generating intermediate data sets.

20. A computer-implemented system for retrieval and processing of a data set from one or more data sources comprising:
   a query structure assembly module for defining a query structure based upon a plurality of query assembly rules and a desired data set, the query assembly rules being used by the query structure assembly module to evaluate the desired data set;
   a syntax assembly module for defining at least one query language statement based upon the defined query structure;
   a process optimization module for evaluating processing options based upon a database schema associated with the data source, the process optimization module including an intermediate data processing method module for evaluating a plurality of methods for generating intermediate data sets within the data source(s);
   whereby at least one query language statement is assembled and run against the data source(s) to return the desired data set; and
   wherein the intermediate data processing method module determines whether creation of a permanent table, temporary table, view, derived table, or sub-query is the most efficient method for handling intermediate data calculations.

21. A computer-implemented method of generating a query language statement to be run against one or more data sources, comprising the steps of:
   generating a query structure based upon a database schema associated with the data source, query assembly rules, and a desired data result set, the query assembly rules being used to evaluate the desired data set;
   generating query language syntax based upon the query structure for returning the desired data result set from the data source(s);
   evaluating a plurality of query assembly rules, syntax descriptions, or syntax patterns for process optimization;
   evaluating a plurality of methods for generating intermediate data sets; and
   wherein the step of evaluating a plurality of methods for generating intermediate data sets comprises determining whether creation of a permanent table, temporary table, view, derived table, or sub-query is the most efficient method for handling intermediate data calculations, and returning the most efficient method for handling intermediate data calculations.

22. A medium having a processor readable program code embodied therein for retrieving and processing data from one or more data sources comprising:

code for causing the processor to evaluate a plurality of sets of tables within the data source(s) for generating a desired data result set;

code for causing the processor to evaluate at least one intermediate data set for reusability in generating the desired data result set;

code for causing the processor to evaluate a plurality of methods for generating intermediate data sets for use in generating the desired data result set;

code for causing the processor to evaluate a plurality of join paths used for joining tables to return the desired data result set;

code for causing the processor to assemble at least one query language statement based upon the query structure and the evaluations of the plurality of sets of tables, the at least one intermediate data set, the plurality of methods for generating intermediate data sets, and the plurality of join paths; and code for determining whether creation of a permanent table, temporary table, view, derived table, or sub-query is the most efficient method for handling intermediate data calculations.

23. A computer-implemented system for constructing a structured query language statement to be run against at least one database, comprising:

a query structure assembly module for constructing a query structure based upon an evaluation of a desired data set by at least one query assembly rule;

a syntax assembly module for defining at least one query language statement based upon the constructed query structure;

a process optimization module for evaluating the construction of the query structure and the defining of the at least one query language statement, the evaluation occurring during the construction of the query structure and/or during the defining of the at least one query statement, the process optimization module serving to evaluate a plurality of methods for generating intermediate data sets; and wherein the process optimization module's evaluation of a plurality of methods for generating intermediate data sets comprises determining whether creation of a permanent table, temporary table, view, derived table, or sub-query is the most efficient method for handling intermediate data calculations, and returning the most efficient method for handing intermediate data calculations.

* * * * *